Sept. 2, 1924.
A. M. YOCOM
1,507,100
STEERING WHEEL BRAKE
Filed Dec. 23, 1922
2 Sheets-Sheet 1
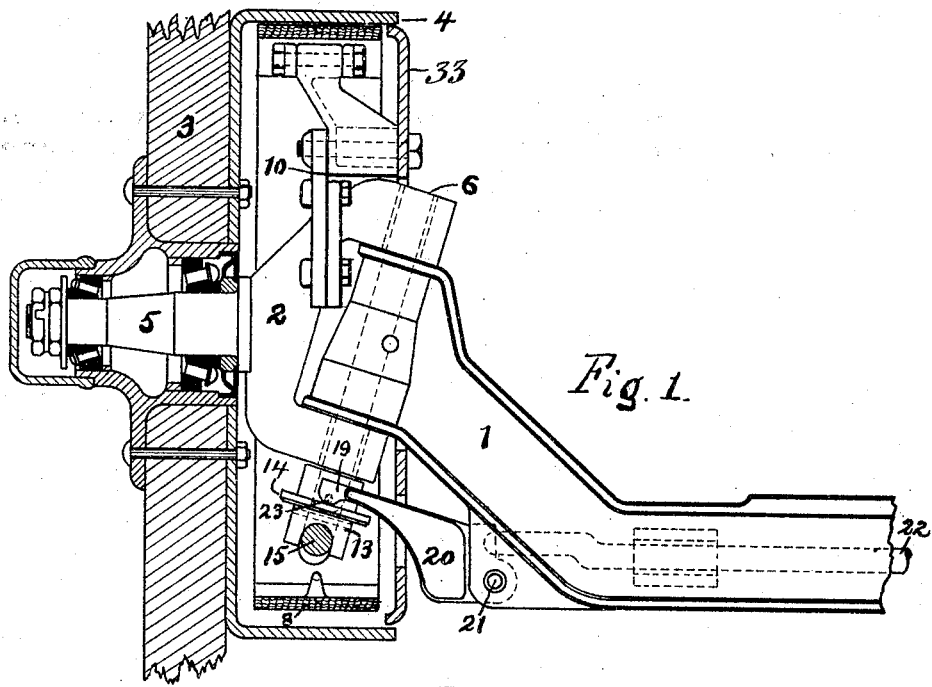
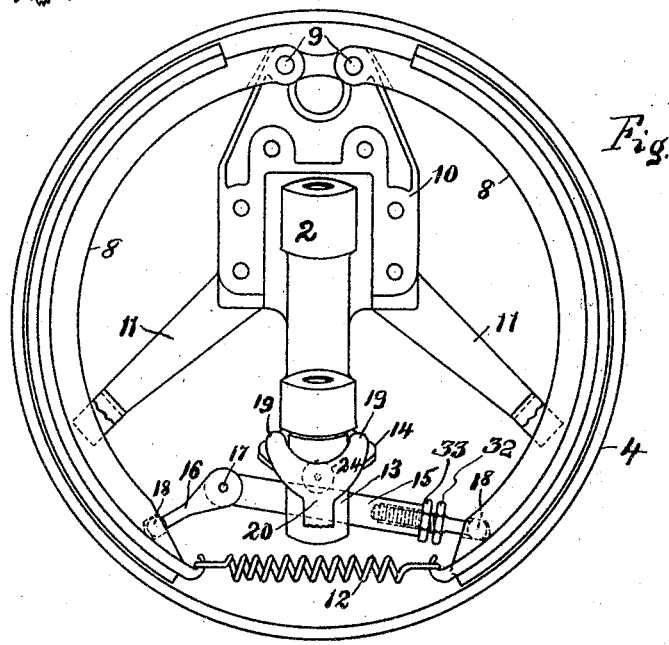
WITNESSES
INVENTOR
Alvin M. Yocom
by Howard A. Coombs
Attorney

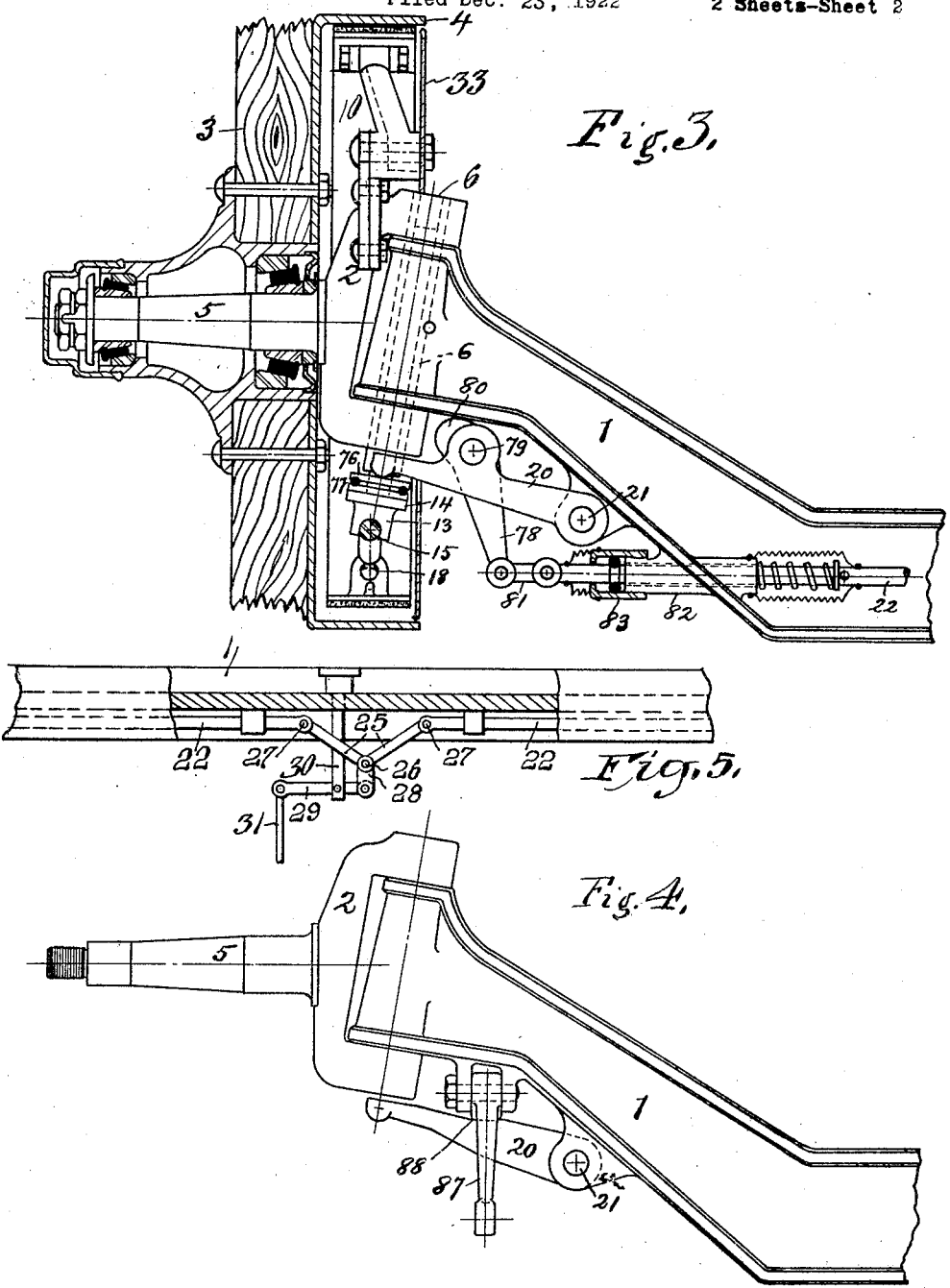

Patented Sept. 2, 1924.

1,507,100

UNITED STATES PATENT OFFICE.

ALVIN M. YOCOM, OF POTTSTOWN, PENNSYLVANIA, ASSIGNOR TO THE U. S. AXLE COMPANY, OF POTTSTOWN, PENNSYLVANIA, A CORPORATION OF DELAWARE.

STEERING-WHEEL BRAKE.

Application filed December 23, 1922. Serial No. 608,668.

*To all whom it may concern:*

Be it known that I, ALVIN M. YOCOM, a citizen of the United States, residing at Pottstown, in the county of Montgomery and State of Pennsylvania, have invented new and useful Improvements in Steering-Wheel Brakes, of which the following is a specification.

This invention relates to brakes for motor vehicles and has for its object the provision of an improved construction of brake for the front or steering wheels, whereby a high degree of flexibility is obtained in applying the brakes at any angle of the wheels and the steering of the wheels is entirely unaffected by the brakes.

It is well known that it is desirable, in the interest of easy steering, to make the axis on which the steering wheel pivots, i. e. the axis of the knuckle pin, intersect the point of contact of the wheel and the ground. This necessitates, of course, an inclination of the knuckle axis and this, in turn, introduces a complication of the braking means, since it is necessary to render the braking action such that it will not interfere with, nor be affected by, the steering movements of the wheel. The mechanism now to be described, accomplishes this object very satisfactorily.

It is illustrated by way of example in the accompanying two sheets of drawing, in which,—

Fig. 1 is a side view of one end of a front axil showing the brake mechanism; the brake drum, brake shoe and cover plate being in section.

Fig. 2 is a side view of the drum and braking means.

Fig 3 is a similar view to Fig. 1, showing a modified mechanism for actuating the brake shoes.

Fig. 4 is a similar view to Fig. 3, with the wheel and drum omitted, showing another modification of said mechanism, and Fig. 5 is a fragmentary view showing one form of means used to apply and equalize the brakes in a pair of wheels.

Referring to these views, 1 represents the end of the front axle of a motor vehicle, which is bent upwardly and contains an inclined bearing for the steering knuckle 2 and its pivot pin 6. Wheel 3 is journalled on the spindle 5 of said knuckle, and carries brake drum 4, while 8, 8 are the brake shoes within said drum, one end of each of which is pivoted at 9 on the brake anchor 10, which fits over the knuckle 2 as a wrench fits on a nut and is bolted thereto, making a very strong joint. The other ends of the shoes are connected by a tension spring 12, against the influence of which they are expanded into the drum by the mechanism now to be described. I will mention here, however, that the brake anchor 10 is, or may be, provided with lateral divergent arms 11, the ends of which engage the sides of the shoes to hold them in place within the drum during the steering movements of the wheel. I use the term "shoes" because I have illustrated my invention as applied to such, but it is equally adapted to expand the ends of an internal brake band, as will be obvious.

The shoe expanding or applying mechanism comprises a yoke member 13, slidable on and rotatable about the axis of the pivot pin 6 and provided with a collar 14. To so mount said yoke member, it is preferably provided with a solid stem, shown in dotted lines in Fig. 3, which fits slidably and rotatably in the hollow pivot pin 6, or said stem may be hollow in the form of a sleeve, fitting between the pivot pin and the bearing in the axle end, as in Fig. 1. It is immaterial to the present invention how this yoke member is mounted, provided it is free to slide axially of the knuckle pin and free to rotate about the axis of said pin. The lower end of said yoke member is bifurcated to fit over the longer one, 15, of a pair of toggle links 15, 16, pivoted together at 17 and engaging the free ends of the shoes by the ball and socket joints 18. It will be seen that this construction provides for a universal movement, that is, a high degree of flexibility in the brake shoe applying means, whereby it is not affected in any way by the angularity of the wheel occasioned by the steering movements. The yoke member 13 is depressed on the pin 6 by the engagement with the collar 14 thereof, of the yoked end 19 of a lever 20, pivoted at 21 on the axle 1 and swung on its pivot to apply the brakes by means under the control of the driver, such as the push-rod 22. When this rod is moved, by means to be described, so as to depress the yoked end 19 of the lever 20, toggle link 15 is depressed and, with it, toggle link 16, said links being free to also move laterally, owing to their ball and socket connection with the shoes and the freedom of the yoke member 13 to rotate about, as well as to slide on, the axis of the pin 6. As shown in Fig. 2, the toggle-link 15 is adjustable in length, as by making it in two parts, a rod 31 carrying the ball end 18 and screwing into the link proper 15, said rod having a hexagonal collar 32 by which it can be rotated and being held in adjusted position by a jam-nut 33. To reduce friction, the ends of the bifurcated arms 19 of the lever 20 may carry small balls 23, see dotted lines Fig. 1, through which they engage the collar 14, and the throat of the slot in the yoke member 13 may be provided with a roller 24, shown in dotted lines in Fig. 2, to engage the toggle link 15. Another friction-reducing means may be employed, as shown in Fig. 3, viz. a ball-bearing ring 76, 77, superposed on the collar 14; however, in practice, the interposition of a plane hardened ring between the collar 14 and the ends 19 of the lever 20 has been found quite sufficient as far as friction is concerned. An advantage of the construction just described is to compensate for the tendency of the drum to draw the rear shoe into contact with, and to force the front shoe away from its friction surface. This is shown as the "wrapping" action of the drum and shoe (or band). The forward shoe requires more pressure than the rear shoe to equalize the lining pressure on the drum, or else the lining on the rear shoe will be worn much faster than that on the forward shoe. The fact that, in the construction described, the link 15 is on an incline towards the front side of the drum, results in imparting a greater tendency to said link to slide towards the front shoe than towards the rear and thereby equalizes the pressure of the two shoes on the drum, which is otherwise unequal on account of the drum trying to throw the front shoe out of contact and the rear shoe into contact with it. While this is the preferred arrangement, it is not essential to my invention; in Fig. 2, either shoe 8 may be considered the front shoe. In Fig. 3 I show the push rod 22 as mounted in self-alining bearings 82, 83, and as connected by a link 81 with a lever 78, pivoted at 79 to the lever 20 pivoted at 21 on the axle 1, and having a cam end 80 which coats with the under surface of the axle 1 to depress the yoked end 19 of said lever 20. A simpler form of means to depress the lever 20 is shown in Fig. 4, where it is actuated by a cam surface 88 carried by a lever 87, connected by any suitable means to the brake pedal or lever 33 is a cover plate bolted to the anchor 10.

The push-rods 22, one for each wheel, are slidably mounted on the axle 1 and may be simultaneously actuated to apply the brakes by a pair of toggle-links 25, pivoted together at 26 and to the inner ends of said rods at 27, see Fig. 5, the pivot 26 being connected by a link 28 to a lever 29, pivoted on a bracket 30, carried by the axle 1, said lever 29 being connected by a rod or cable 31 to the brake pedal (not shown). It will also be clear that, since the toggle 25 is not in itself rigidly connected to the axle, it acts as an equalizer, as well as an actuator; that is to say, if one rod 22 applies the shoes on one side first, said rod stops and the toggle 25 then moves the other rod 22 until its shoes are also applied, whereupon a further actuation of the pedal and of the connection 31 applies both brakes with equal force.

It will be apparent from the above description, read in connection with the drawing, that absolute freedom of movement of the brake-shoe actuating means is provided for whatever the angular position of the wheel may be. While I have shown the slot in the end of the yoke member as parallel to the axis of the knuckle pin, it may be and preferably is slightly offset in practice, that is, lies more nearly vertical than said axis, whereby the downward pressure of the yoke member does not have so much tendency to push the toggle-links and shoes laterally. Naturally other minor changes in the design may be made without changing the invention. I may repeat that the word "shoe(s)", as used in the claims, is intended to cover a split band as well. Certain features of the invention are obviously applicable to rear wheel brakes or to front wheel brakes in which the knuckle axis is vertical. Nor is the invention necessarily limited to the brakes of motor vehicles, although that is its most important application.

Having thus described my invention what I claim is:—

1. An internal brake comprising a rotary drum, a relatively fixed expansible member within said drum, a pair of toggle-links to expand said member, a slidable yoke member straddling said links, and means to actuate said yoke member.

2. In the brake of claim 1, the ends of said toggle-links being of spherical shape and the expansible member having correspondingly shaped sockets.

3. In the brake of claim 1, the toggle-links being of unequal length and the yoke member straddling the longer link, which is adjustable in length.

4. In the brake of claim 1, the yoke member being free to turn about an axis parallel to its path of sliding movement.

5. In the brake of claim 1, the expansible member consisting of two shoes, each pivoted at one end to a relatively fixed support with a tension spring connecting their free ends, the toggle-links acting on said free ends, and arms carried by said support to prevent lateral movement of said shoes.

6. A brake for a steering wheel which is pivoted on an inclined axis, comprising the combination with the knuckle mounted on an inclined pivot pin, the drum carried by the wheel, and the brake shoes pivoted on said knuckle within said drum; of a toggle between the free ends of said shoes, a yoke member engaging but unattached to said toggle, said member being slidable in the direction of the axis of said pivot pin, and means to slide said member to actuate said toggle.

7. In the brake of claim 6, the yoke member being free to turn about the axis of the pivot pin.

8. In the brake of claim 6, the toggle-links engaging the brake shoes by ball-and-socket joints.

9. In the brake of claim 6, the yoke member having a collar, and the means to slide said yoke member comprising a bifurcated lever pivoted on the axle and bearing on said collar at diametrically opposite points.

10. Brake for steering wheels pivoted on inclined knuckle pins carried by the axle, comprising the combination with the brake drums, brake shoes within the same, and toggle-links for expanding said shoes; of members slidable in the direction of the axes of said knuckle-pins for actuating said toggle-links, levers pivoted on the axle and engaging said members, means slidable on the axle to actuate said levers, and a common actuator for said slidable means, said actuator being carried by said means, so that the movement of the latter and consequently the application of the brakes, is equalized.

11. In the brakes of claim 10, the members for actuating the toggle-links being free to turn about said inclined axes and having bifurcated ends to engage one of the pair of links.

12. In the brakes of claim 10, the levers carrying pivoted cams bearing against the axle and the slidable means acting on said levers through said cams.

13. In the brakes of claim 10, the actuator consisting of a pair of toggle-links connecting the ends of said slidable means, and a connection from the common pivot of said toggle links to the brake pedal.

14. In the brakes of claim 10, the toggle-links having ball ends and the brake shoes having sockets to receive said ends, one of said links being adjustable in length.

15. A steering wheel brake, comprising a drum fast to the wheel, a knuckle pin on which the wheel is pivoted, an expansible member within said drum, a pair of toggle links to expand said member, a member slidable on the axis of said pin and straddling said links, and having a collar, a lever pivoted on the fixed axle and having a bifurcated end engaging said collar, means slidable on the axle to actuate said lever, and a spring to retract said expansible member.

16. A steering wheel brake, comprising a drum fast to the wheel, an inclined knuckle pin on which the wheel is pivoted, a pair of shoes within said drum, toggle links to expand said shoes, a member slidable and rotatable on the axis of said pin and having a bifurcated end straddling said links, a lever pivoted on the fixed axle and engaging said member to actuate said links, a cam pivoted on said lever and engaging the fixed axle, means to swing said cam, and a spring to retract said shoes.

In testimony whereof I have hereunto set my hand.

ALVIN M. YOCOM.